July 26, 1927.

J. GREENBERG ET AL 1,637,300

BRAKE MECHANISM

Filed Feb. 4, 1927

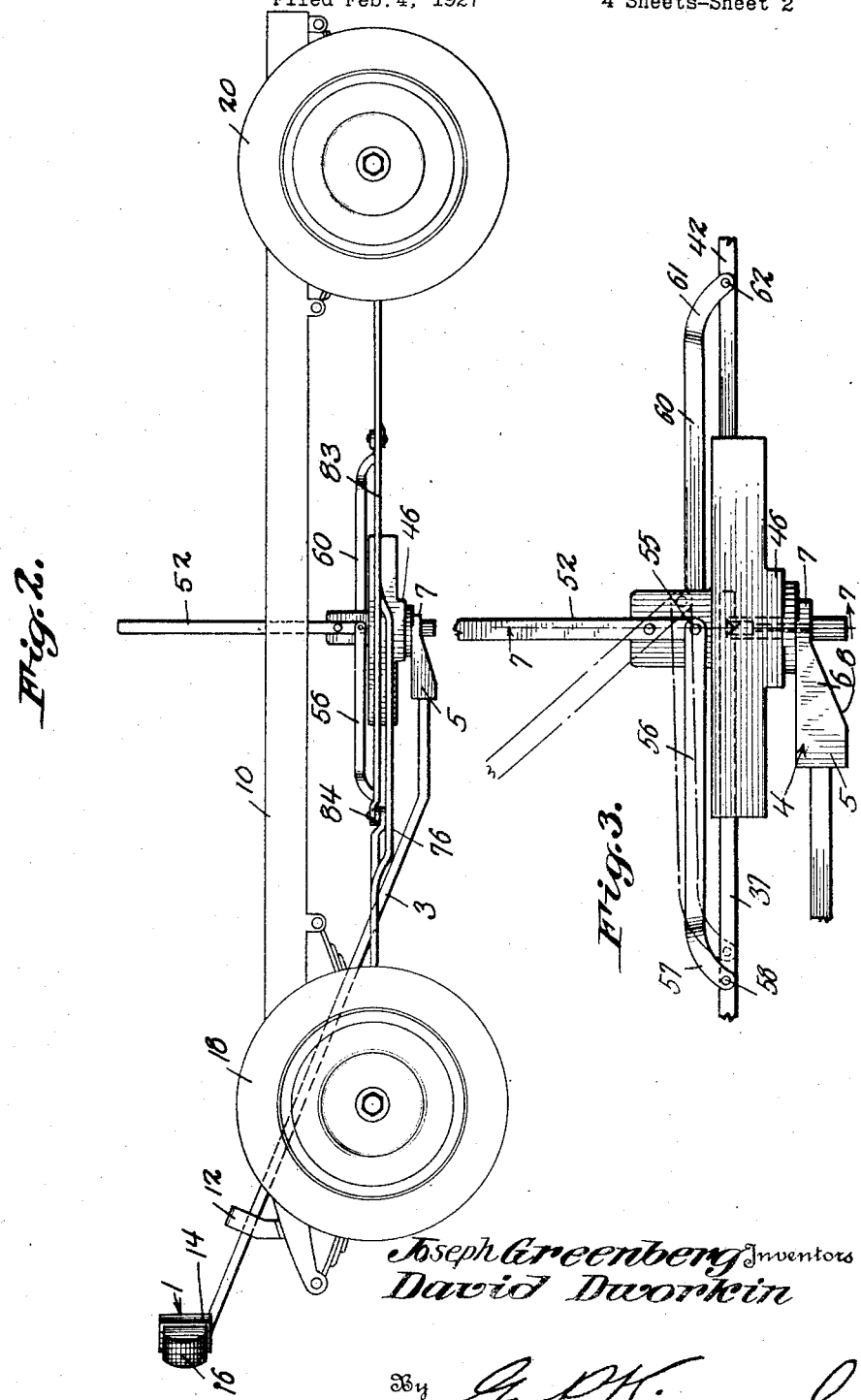

July 26, 1927.  
J. GREENBERG ET AL  
1,637,300  
BRAKE MECHANISM  
Filed Feb. 4, 1927  
4 Sheets-Sheet 3

Joseph Greenberg  
David Dworkin  
Inventors

By Geo. P. Kimmel  
Attorney

July 26, 1927.  1,637,300

J. GREENBERG ET AL

BRAKE MECHANISM

Filed Feb. 4, 1927   4 Sheets-Sheet 4

Joseph Greenberg
David Dworkin
Inventors

By Geo. F. Kimmel
Attorney

Patented July 26, 1927.

1,637,300

UNITED STATES PATENT OFFICE.

JOSEPH GREENBERG AND DAVID DWORKIN, OF WILKES-BARRE, PENNSYLVANIA.

BRAKE MECHANISM.

Application filed February 4, 1927. Serial No. 165,890.

This invention relates to a brake mechanism for motor vehicles, more particularly to that type of emergency brake mechanism, which is released by the bumper of the vehicle to automatically provide for the application of such mechanism, and the invention has for its object to provide, in a manner as hereinafter set forth, a brake mechanism of the class referred to by means of which, when the bumper of the vehicle impacts against an obstruction, the brake mechanism will be released and automatically applied whereby the wheels of the vehicle will be absolutely and immediately stalled against further rotation, under such conditions reducing the severity of accidents to a minimum.

Further objects of the invention are to provide, in a manner as hereinafter set forth, a brake mechanism for the purpose referred to which is comparatively simple in its construction and arrangement, strong, durable, compact, thoroughly efficient in its use, automatic in its action, readily installed with respect to the vehicle with which it is to be employed, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view of the chassis of a motor vehicle and the wheels of the latter and further showing the adaptation therewith of a buffer or bumper released brake mechanism in accordance with this invention.

Figure 2 is a side elevation of the structure illustrated in Figure 1.

Figure 3 is a fragmentary view, in side elevation, illustrating the latching means for the mechanism and further illustrating means for restoring the brake mechanism from applied to non-applied position.

Figure 4:
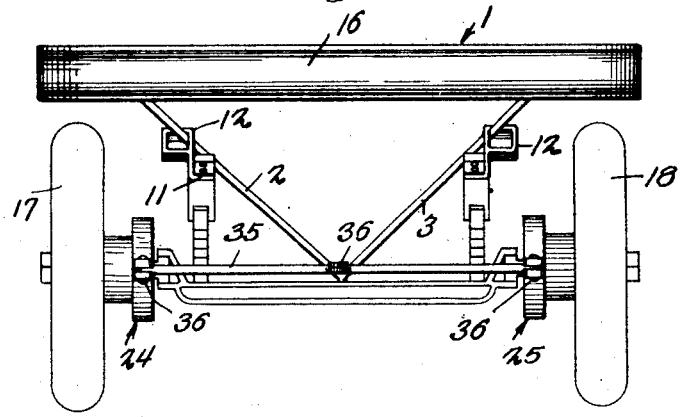
Figure 4 is a front elevation of Figure 1.
Figure 5:
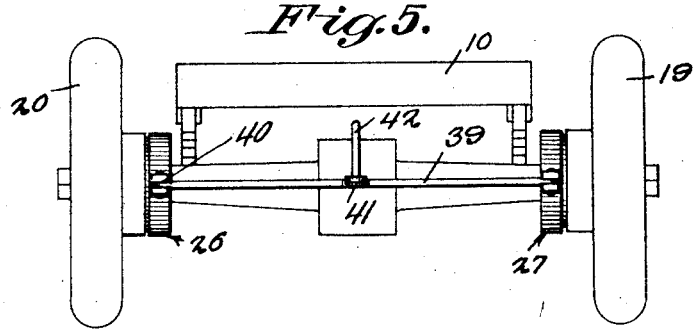
Figure 5 is a rear elevation of Figure 1.
Figure 6:
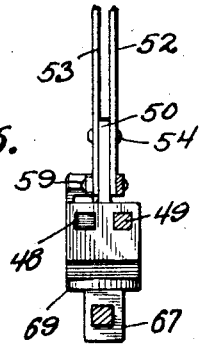
Figure 6 is a fragmentary view in vertical section looking towards the forward end of the latching means.
Figure 8:
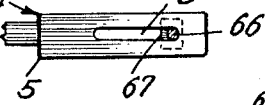
Figure 8 is a fragmentary view, in plan and partly in section, of the rear end of the releasing means for the latch.

Referring to the drawings in detail, a brake mechanism, in accordance with this invention, includes a buffer-operated releasing mechanism for the braking means. A braking means is employed for each of the wheels of the vehicle and when released by the bumper-operated releasing mechanism the several braking means automatically become active and apply a braking action to the several wheels of the vehicle to immediately stall the wheels against further rotation. The releasing mechanism, which includes the buffer or bumper 1 further includes a pair of rearwardly extending, oppositely inclined, bars 2, 3 which are also downwardly inclined and at their rear ends merge into a rearwardly extending longitudinally disposed shifting arm 4 formed of a forward portion 5, an intermediate portion 6 and a rear portion 7. The forward portion 5 is of greater height than the rear portion 7 and the intermediate portion 6 has its lower face, indicated at 8 inclining upwardly from the lower face of the portion 5 to the lower face of the portion 7. The arm 4 is provided with a lengthwise disposed slot 9 which is arranged at the longitudinal median thereof and extends entirely through the intermediate portion 6 and partly through the rear portion 7. The slot 9 has its forward end positioned a substantial distance from the forward end of the arm 4 and its rear end positioned a substantial distance from the rear end of the arm 4. The inclined lower face 8 of the intermediate portion 6 forms a cam surface for a purpose to be presently referred to.

The chassis of the vehicle is indicated at 10 and each side bar, in proximity to its forward end, has fixedly secured thereto, by the holdfast devices 11, a laterally extending combined guide and keeper 12. The keepers 12 are oppositely disposed with respect to each other and the bars 2, 3 extend through the keepers and project forwardly thereof, and are fixedly secured to the rear side of the buffer or bumper 1, as at 13. The buffer or bumper 1 comprises a metallic bar 14 of appropriate length and which is formed with rearwardly curved end terminal portions 15, and which has secured to its forward face, a cushioning means 16 constructed of rubber and which is co-extensive with said face. The keepers 12 also act as supports for the bars 2, 3 and for the buffer or bumper 1.

The front wheels of the vehicle are indicated at 17, 18 and the rear wheels at 19, 20. Associated with the rear wheels 19, 20 is a braking mechanism of known construction indicated at 21. The steering mechanism of the front wheels is generally referred to by the reference character 22 and the differential, which is associated with the rear axle, is indicated generally at 23. The emergency brake mechanism, in accordance with this invention is independent of the brake mechanism 21.

Figure 7:
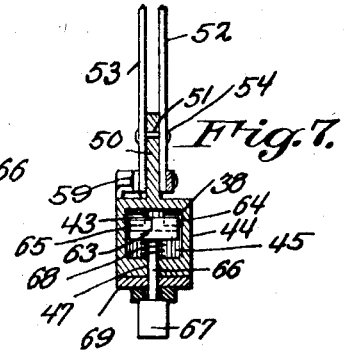
Figure 7 is a section on line 7—7 Figure 3.
Figure 9:
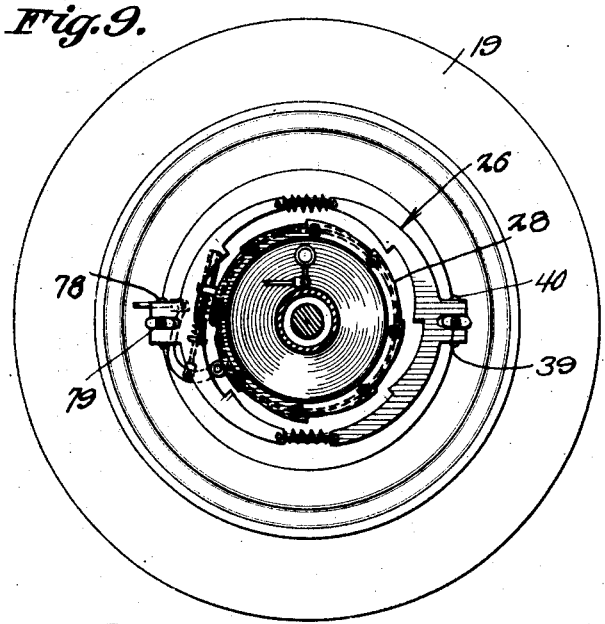
Figure 9 is an elevation illustrating the arrangement of the braking device in connection with the rear wheel.
Figure 10:
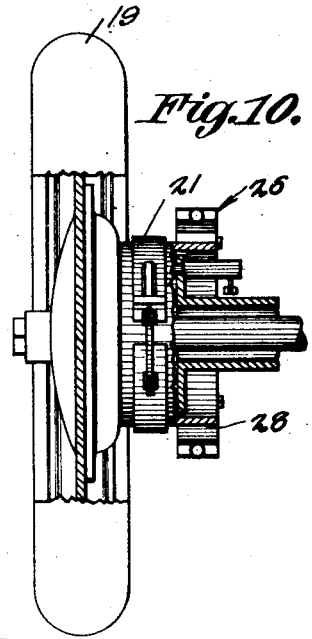
Figure 10 is a fragmentary view, in vertical section, illustrating the arrangement of the braking device with respect to a rear wheel.
Figure 11:
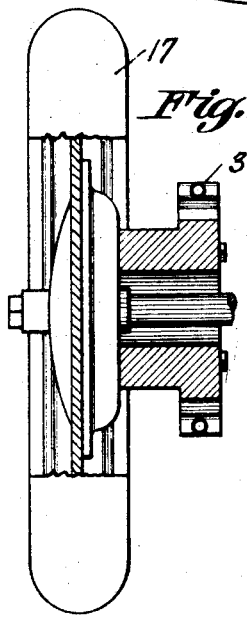
Figure 11 is a fragmentary view, in vertical section, illustrating the arrangement of the braking device with respect to a front wheel.
Figure 12:
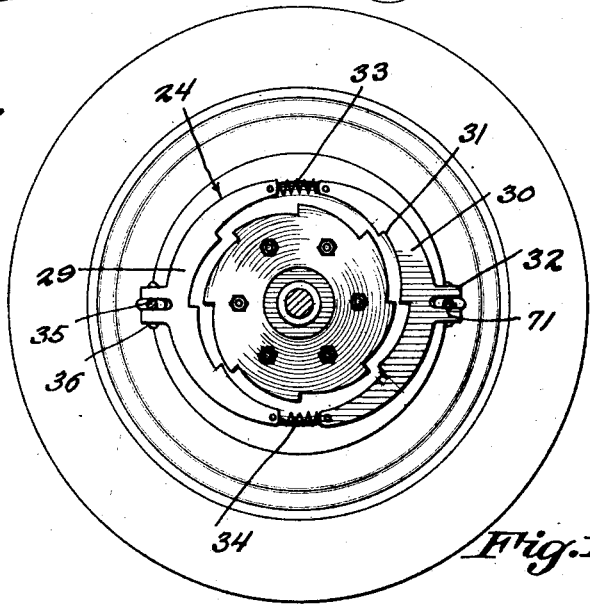
Figure 12 is an elevation showing the arrangement of the braking device with respect to a front wheel.

The braking means employed in connection with each wheel of the vehicle, is of the same construction, and but one will be described, as the description of one will apply to the other. The braking means employed in connection with the wheels 17, 18, 20 and 21 are indicated at 24, 25, 26 and 27 respectively. Each braking means, or what may be termed braking device, includes an annulus 28, in the form of a ratchet wheel, and which is fixedly secured with the wheel with which it associates, so that the ratchet wheel will revolve with the vehicle wheel. Associated with the ratchet wheel 28, surrounding the same and normally arranged in spaced relation with respect thereto, is a pair of oppositely disposed brake shoes 29, 30 of semi-circular contour, and each of which has its inner face constructed in the form of a ratchet indicated at 31. Each brake shoe, centrally of its outer face or edge is provided with a pair of spaced apertured lugs 32 arranged in opposed relation. One end of the brake shoe 29, is connected to the opposed end of the brake shoe 30 by a controlling spring 33, and the other end of the brake shoe 29 is connected to the opposed end of the brake shoe 30 by a controlling spring 34. The function of the springs 33 and 34 is to shift the brake shoes 29, 30 towards each other and also towards the ratchet wheel 28, so that the shoes and ratchet wheel will interengage with each other thereby preventing the revolving of the vehicle wheel. The brake shoes 29, 30 do not revolve with the ratchet wheel 28 and are supported normally in a stationary position in a manner to be presently referred to. The brake shoes 29, 30 normally are in extended positions relative to each other and which provides for the extension of the springs 33, 34, whereby when the shoes 29, 30 are released in a manner to be presently referred to, the springs 33, 34 will cause the application of the shoes with respect to the ratchet wheel 28 and set up a braking action with respect to the vehicle wheel to prevent the rotation thereof. The brake shoes 29, of the braking devices 24, 25 are coupled together by a connecting bar 35 disposed transversely with respect to and below the chassis 10. The ends of the bar 35 are pivotally connected to the brake shoes 29, as at 36. Pivotally connected to the bar 35, as at 36 is the forward end of a rearwardly directed latching rod 37 having formed in its lower face in proximity to its rear end, a recess 38, see Figures 3 and 7.

The brake shoes 30 of the braking devices 26, 27 are coupled together by a transversely extending connecting bar 39 extending transversely of and below the chassis 10 and pivotally connected at its ends to said brake shoes 30 as at 40. Pivotally connected, as at 41 to the connecting bar 39 is the rear end of a forwardly directed latching rod 42 provided in its lower face in proximity to its forward end, with a recess 43, see Figures 3 and 7. The recesses 38 and 43 are of triangular contour and are oppositely disposed with respect to each other.

Supported from the chassis 10, in any suitable manner, is a casting 44, extending longitudinally with respect to the chassis 10 and which is formed centrally thereof with a vertical chamber 45. The casting 44 is furthermore formed centrally of its bottom with a depending portion 46, of rectangular contour having a plane lower face. The casting 44 is also formed with a vertically disposed opening 47, at the vertical median thereof and which opens into the chamber 45 and at the lower face of the depending portion 46. The casting 44, near its top is provided with a pair of spaced channels 48, 49 extending longitudinally of the casting and arranged between the longitudinal median and sides of the casting. The channels 48, 49 are intersected by the upper end of the chamber 45. The locking rod 37 is slidably mounted in the channel 48 and the locking rod 42 is slidably mounted in the channel 49. The latching rods, when in latching position, do not extend entirely through the channels 48, 49. The latching rods are spring controlled, due to the action of the controlling springs 33, 34. The latching rods provide means for maintaining the brake shoes 29 and 30 in spaced relation with respect to each other and with respect to the ratchet wheels 28 against the action of the controlling springs 33, 34. The casting 44 has formed integral with the top thereof, at its longitudinal median, with an upstanding web 50 of suitable height and length and the web 50 in proximity to its upper end is formed with an opening 51. Positioned against each side face of the web 50 is a setting lever and these levers are indicated at 52, 53. Mounted in the opening 51 is a pivot member 54 common to the levers 52, 53. The levers project a substantial distance above the web 50 and the lever 52 has pivotally connected to its lower end, as at 55, a forwardly directed pull link 56 which has its forward terminal portion bent downwardly as at 57 and pivotally connected as at 58 to the latch rod 37. The lever 52, in connection with the pull link 56, is provided for shifting the latch rod 37 rearwardly so that it can be latched to maintain the braking devices for the forward wheels of the vehicle in a non-applied position. Pivotally connected to the lower end of the lever 53, as at 59 is the forward end of a rearwardly directed pull link 60 having its rear terminal portion 61 downturned and pivotally connected as at 62 to the latch rod 42. The lever 53, in connection with the pull link 60 provides means for shifting the latch rod 52 forwardly so that it can be held in latched position, in a manner to be presently referred to, whereby the braking devices for the rear wheels of the vehicle are held in non-applied position against the action of their controlling springs.

Common to the latch bars 37, 42 for maintaining them in latching position, is a latching member 63 arranged in the chamber 45 and which is spring controlled. The latching member at its upper end is provided with a pair of oppositely disposed teeth 64, 65, the former associating with the recess 38 and the latter with the recess 43. The latching member 63 includes a stem 66, which slidably extends through the opening 47 and slot 9, and has its lower end formed with a head 67. Surrounding the stem 66 and interposed between the bottom of the chamber 65 and the toothed portion of the member 63 is a coiled spring 68, which normally maintains the toothed portion of the latching member 63 in engagement with the recesses 38, 43, under such conditions latching the rods 37, 42 to maintain the braking devices in non-applied position against the controlling springs of these latter.

The stem 66 also passes through a wear member or washer 69 which is positioned against the lower face of the depending portion 46 of the casting 44. The arm 4 has the rear portion 7 thereof normally interposed between the wear member 69 and the top of the head 67, see Figures 3 and 7. The arm 4 provides means for shifting the latching member downwardly, to move the teeth 64 and 65 clear of the recesses 38, 43 for the purpose of releasing the latching rods 37 and 42. The cam surface formed by the lower face 8 of the intermediate portion 6 of the arm 4 provides, when the arm 4 is shifted rearwardly for the lowering of the stem 66 whereby the latching member 63 is shifted clear of the latching rods 37, 42. The arm 4 is shifted rearwardly when the bumper or buffer 1 impacts with an obstruction and carries the bars 2, 3, therewith in a rearward direction and under such conditions the arm 4 is carried therewith and the inclined face 8 of the intermediate portion 6 of the arm 4 will shift the latching member to released position.

Pivotally connected to the brake shoe 30, of the braking device 24 as at 70, is a rearwardly extending and inwardly inclined holding bar 71, and which has its rear end pivotally connected as at 72 to a coupling bar 73 pivotally connected as at 74 to the latching rod 42. Pivotally connected, as at 75 to the brake shoe 30 of the braking device 25 is the forward end of a rearwardly directed and inwardly inclined holding bar 76, which has its rear end pivotally connected, as at 77, to the other end of the bar 73. The bars 71 and 76 are oppositely inclined with respect to each other and the inclination thereof provides for a clearance when the front wheels of the vehicle are steered.

Pivotally connected, as at 78, to the brake shoe 29 of the braking device 26 is the rear end of a forwardly directed holding bar 79 having its forward end pivotally connected as at 80, to a coupling bar 81, the latter being pivotally connected as at 82, to the latching rod 37. Pivotally connected as at 83 to the brake shoe 29 of the braking device 27 is the rear end of a forwardly directed holding bar 83, which has its forward end pivotally connected as at 84 to the other end of the coupling bar 81. The holding bars 71 and 76, coact with the latching rod 42, to maintain the several braking shoes 30 in non-applied position and the holding bars 79 and 83, coact with the latching rod 37 for maintaining the several brake shoes 29 in non-applied position. The release of the bars 71 and 76 is had on the release of the latching rod 42 and the release of the holding bars 79, 83 is had on the release of the latching rod 37.

The arrangement of the latching rod 37, with respect to the holding bars 79 and 83 and the latching rod 42 with respect to the holding bars 71, 76, as well as the arrangement of the latching rods and holding bars with respect to the coupling bars 35, 39, 73 and 81 will not only support the brake shoes, but will when the latching rods 31, 42 are latched, maintain the brake shoes 29 in spaced relation with respect to the brake shoes 30 against the action of their controlling springs.

After the braking devices have been released and applied, they are shifted to non-applied position, by the setting levers 52, 53, and these latter when operated, the setting lever 52 shifted forwardly and the setting lever 53 shifted rearwardly, will move the latching rods 37 and 42 in a position to be engaged by the latching member. When the rods 37, 42 are shifted so they can be latched, by the latching member the holding bars are shifted in unison with the latching rods 37 and 42.

It is thought the many advantages of a brake mechanism in accordance with this invention for the purpose set forth can be readily understood, and while the form of the invention herein shown and described is what is believed to be the preferred embodiment thereof, it is nevertheless to be understood that various forms, modifications and arrangement of parts may be made without departing from the spirit and the scope of the invention as claimed.

What we claim is:

1. A braking mechanism for the wheels of motor vehicles comprising a braking device for each of the vehicle wheels consisting of a brake element adapted to be fixed to and revolve with the vehicle wheel, a pair of oppositely disposed, normally latched, spring controlled brake shoes connected together by the spring controlling means therefor, opposing, surrounding and normally spaced from said element against the action of said means and co-acting, when released, with said element to apply a braking action to the wheel, and a bumper operated releasing mechanism for said shoes.

2. A braking mechanism for the wheels of motor vehicles comprising a braking device for each of the vehicle wheels consisting of a brake element adapted to be fixed to and revolve with the vehicle wheel, a pair of oppositely disposed, normally latched, spring controlled brake shoes connected together by the spring controlling means therefor, opposing, surrounding and normally spaced from said element against the action of said means and co-acting, when released, with said element to apply a braking action to the wheel, a bumper operated releasing mechanism for said shoes, said element in the form of a ratchet wheel, and each of said shoes of semi-circular contour and having its inner face in the form of a ratchet.

3. A braking mechanism for motor vehicle wheels comprising a braking device for each of the wheels of a vehicle and consisting of a ratchet wheel adapted to be fixed to and revolve with the vehicle wheels, a pair of oppositely disposed normally latched, semi-circular brake shoes opposing, surrounding and normally spaced from said element, a pair of controlling springs for connecting the ends of said brake shoes together, means for latching said brake shoes against the action of said controlling springs, and a bumper operated releasing mechanism for said shoes to provide for these latter coacting with said ratchet wheels to apply a braking action to the vehicle wheels.

4. In a brake mechanism for motor vehicle wheels, a wheel brake comprising a ratchet wheel adapted to be fixed to and revolve with the wheel, a pair of oppositely disposed, non-revoluble, laterally shiftable semi-circular brake shoes opposing, surrounding and normally spaced from said ratchet wheel and each having its inner face of ratchet like form for engagement with the latter when released, and controlling springs connecting the ends of the brake shoes together and acting when the brake shoes are released, to automatically shift them to engage the ratchet wheel to provide a brake action for the vehicle wheel.

5 In a brake mechanism for motor vehicles, a pair of non-revoluble, oppositely disposed, laterally shiftable spring controlled, normally latched brake shoes automatically acting when released to apply a braking action to the wheel, each of said shoes having its inner face of ratchet-like form, the controlling springs for said shoes connecting the ends of one shoe to the ends of the other shoe.

6. In a brake mechanism for vehicle wheels comprising in combination with a spring controlled braking device for each front and each rear wheel, a forward, a pair of inner and rear coupling bars, a forwardly extending and a rearwardly extending latching rod adapted when latched to maintain the braking devices in non-applied position against the action of their controlling springs, pivotal connections between the forward rod and the forward one of said inner bars, pivotal connections between said rear rod and the rear and the other inner bar, a pair of rearwardly directed holding bars pivotally connected to the front wheel braking devices and to one of the inner bars, a pair of forwardly directing holding bars pivotally connected to the rear wheel braking devices and to the other of the inner bars, pivotal connections between said forward coupling bar and the front wheel braking devices, pivotal connections between said rear coupling bar and front wheel braking devices, and a bumper released latching mechanism for said rods.

In testimony whereof, we affix our signatures hereto.

JOSEPH GREENBERG.
DAVID DWORKIN.